(12) United States Patent
Perisetty

(10) Patent No.: US 8,099,704 B1
(45) Date of Patent: Jan. 17, 2012

(54) PERFORMANCE IMPROVEMENTS IN AN INTEGRATED CIRCUIT BY SELECTIVELY APPLYING FORWARD BIAS VOLTAGES

(75) Inventor: Srinivas Perisetty, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 729 days.

(21) Appl. No.: 12/181,206

(22) Filed: Jul. 28, 2008

(51) Int. Cl.
*G06F 17/50* (2006.01)
(52) U.S. Cl. ............ 716/134; 716/113; 326/37; 326/38; 326/41; 326/47
(58) Field of Classification Search .................. 716/111, 716/113, 133, 134; 326/38, 41, 27, 47
See application file for complete search history.

(56) References Cited

U.S. PATENT DOCUMENTS

| | | | |
|---|---|---|---|
| 2007/0040577 A1* | 2/2007 | Lewis et al. | 326/41 |
| 2007/0069764 A1* | 3/2007 | Lewis et al. | 326/38 |

* cited by examiner

*Primary Examiner* — Vuthe Siek
(74) *Attorney, Agent, or Firm* — Womble Carlyle Sandridge & Rice, LLP

(57) ABSTRACT

Methods and systems to improve performance in an Integrated Circuit (IC) are presented. The method includes performing a timing analysis for a circuit design of an IC. The modules in the circuit design use a standard voltage bias by default. In one embodiment, the timing analysis is performed by a circuit design tool. The method then identifies a critical path in the timing analysis, where a signal propagating through the critical path does not meet timing requirements for the circuit design. The method then selects a module of the IC in the critical path to apply a high speed voltage bias to the body of transistors in the module, resulting in a smaller propagation delay thorough the selected module than if the standard voltage bias were applied to the selected module, thus allowing the circuit design to meet the timing requirements.

20 Claims, 7 Drawing Sheets

PERFORMANCE IMPROVEMENTS IN AN INTEGRATED CIRCUIT BY SELECTIVELY APPLYING FORWARD BIAS VOLTAGES

BACKGROUND

1. Field of the Invention

The present invention relates to methods and systems for improving power management in Integrated Circuits (IC), and more particularly, methods and systems for improving performance of an IC while managing the power consumed by the IC.

2. Description of the Related Art

The performance increases of new integrated circuits (IC), and particularly Programmable Logic Devices (PLD), including Field-Programmable Gate Arrays (FPGA), can result in significant increases in power consumption, introducing the risk of devices that consume unacceptable amounts of power. Power consumption becomes a critical issue because static power can increase dramatically with the new higher component densities. Static power consumption rises largely because of increases in leakage current, including tunneling current across the thinner gate oxides that are used in new processes, as well as subthreshold leakage (channel- and drain-to-source current). Also, without any specific power optimization effort, dynamic power consumption can increase due to the higher density of switching transistors combined with the higher switching frequencies that are attainable.

Although power requirements vary across different applications, the benefits of lower power consumption are applicable to any hardware platform because of the inherent cost, complexity, and reliability advantages. Today's design trends—such as increasing compactness of system form factors and portability—have significantly heightened the sensitivity to power consumption in PLDs, in particular. In "tethered" applications where wall power is the primary source, system enclosures are becoming dramatically thinner and smaller, restricting airflow, heat sink, size, and other thermal management solutions. In portable applications, a relatively new domain for FPGAs, battery-life objectives place new restrictions on both static and dynamic power consumption. These shifts in design goals make power consumption one of the critical factors when choosing and programming ICs.

As a result, there is a need to manage the balance between power and performance in today's ICs. It is in this context that embodiments of the invention arise.

SUMMARY

Embodiments of the present invention provide methods and systems for improving performance in an integrated circuit (IC). A high voltage bias is selectively used in modules of the IC to improve their performance, allowing the designer to meet timing constraints while reducing overall power consumption by not having to use the high voltage bias in all the modules of the IC.

It should be appreciated that the present invention can be implemented in numerous ways, such as a process, an apparatus, a system, a device or a method on a computer readable medium. Several inventive embodiments of the present invention are described below.

In one embodiment, a method is presented to improve performance in an IC. The method includes performing a timing analysis for a circuit design of an IC. The modules in the circuit design use a standard voltage bias by default. In one embodiment, the timing analysis is performed by a circuit design tool. The method then identifies a critical path in the timing analysis, where a signal propagating through the critical path does not meet timing requirements for the circuit design. The method selects a module of the IC in the critical path to apply a high speed voltage bias, resulting in a smaller propagation delay through the selected module than if the standard voltage bias were applied to the selected module, thus allowing the circuit design to meet the timing requirements.

In another embodiment, a system to improve performance in an IC is presented. The system includes a circuit design, a circuit design tool, voltage bias generating circuits, and a multiplexer. The circuit design tool creates programming information for the IC according to the circuit design. The circuit design tool also performs timing analysis of the circuit design to identify a critical module of the IC in a critical path for signal propagation. A standard voltage bias generating circuit outputs a standard voltage bias that is applied by default to modules in the IC. Similarly, a high speed voltage bias generating circuit outputs a high speed voltage bias that is greater than the standard voltage bias. The multiplexer in the IC has as inputs the standard voltage bias and the high speed voltage bias, and the output of the multiplexer is connected to the critical module. The programming information for the IC causes the multiplexer to select the high speed voltage bias, making the signal delay thorough the critical module smaller than if the standard voltage bias was applied.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
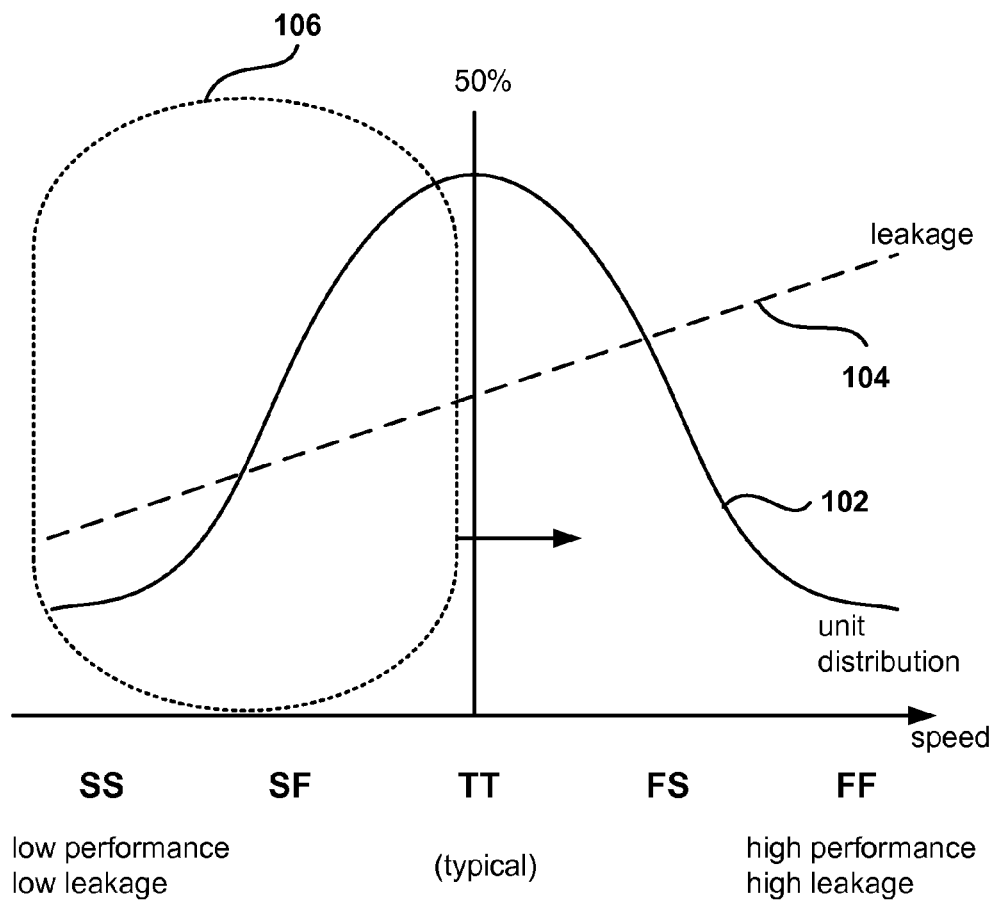
FIG. 1 shows the relationships between PLD speed and unit distribution, and between transistor speed and power leakage.

The following embodiments describe a method and apparatus for improving performance in an IC in the context of PLDs. The described method includes performing a timing analysis for a circuit design of a PLD. In one embodiment, the timing analysis is performed by a circuit design tool. The modules in the circuit design are powered using a standard voltage bias. A critical path is identified in the timing analysis operation, where a signal propagating through the critical path does not meet timing requirements for the circuit design. The method then selects a module of the PLD in the critical path to apply a high speed voltage bias, resulting in a smaller propagation delay thorough the selected module than if the standard voltage bias were applied to the selected module, thus allowing the circuit design to meet the timing requirements.

The high speed voltage bias is applied to the bodies of transistors in the selected modules, thereby lowering the $V_T$ of those transistors and increasing their speed, resulting in a lower signal delay through the transistors in the module and in the module overall. For example, when using a NMOS transistor under normal operating conditions, the voltage at the body (B) is the same as the voltage at the source (S). If a high speed bias is applied to the NMOS transistor, then the voltage of B is larger than the voltage at S, therefore reducing the $V_T$ and speeding up the transistor switching time. Alternatively, when applying a high speed bias to a PMOS transistor, then the voltage of B is less than the voltage at S, thus reducing the $V_T$ also. When using a $V_{cc}$ of 1V, a typical value for the difference between the high speed voltage bias and the standard voltage bias is about 400 mV, positive or negative depending on whether it is a NMOS or a PMOS transistor.

The ability of applying selectively different voltage bias in the PLD allows the circuit designer to manage the power consumption of the PLD while meeting the processing speed requirements of the intended use of the PLD. Programmable logic systems, as well as other circuit designs, are often created with the help of Computer Aided Design (CAD) tools. Typically, a designer creates a Hardware Description Language (HDL) design file, sometimes called a Verilog HDL file, with instructions for the circuit functionality. The CAD tool creates a circuit description after several steps that can be described at a high level as synthesis, place & route, timing analysis, and simulation. The result is a binary file with instructions for programming and configuration of the programmable logic system. An example of a commercially available CAD tool is QUARTUS™ II available from the assignee.

It will be obvious, however, to one skilled in the art, that the present invention may be practiced without some or all of these specific details. In other instances, well known process operations have not been described in detail in order not to unnecessarily obscure the present invention.

FIG. 1 shows the relationships between PLD speed and unit distribution, and between transistor speed and power leakage. Unit distribution curve 102 shows a typical distribution of the speed binning for different transistors. The speed performance variation can be described with respect to the NMOS and PMOS performance, and to typical (T) values. The NMOS or PMOS performance can be slow (S) or fast (F). In the speed axis of FIG. 1, five values or speed corners are identified, SS, SF, TT, FS and FF, where the first letter corresponds to the nMOS performance, and the second letter corresponds to the pMOS performance.

As the speed of the transistor increases, so does power consumption, voltage requirements and transistor leakage. Circuit designers choose the type of transistor according to the application. For example, automobile applications tend to use slower transistors (SS or SF), while commercial applications tend to use typical (TT) or fast transistors (FS or FF). However, there may be situations where a designer has power consumption constraints that require the use of slower transistors, and speed constraints that require the use of faster transistors. If the designer increases the voltage bias globally to the PLD, the power consumption may exceed operating margins. It is desirable to be able to selectively apply higher voltage bias to some transistors in the PLD to increase their speed without having to unnecessarily increase the power to other transistors that do not need higher performance. Typically, all the transistors to the left of typical value TT, inside region 106, are candidates for speed improvements.

Figure 2:
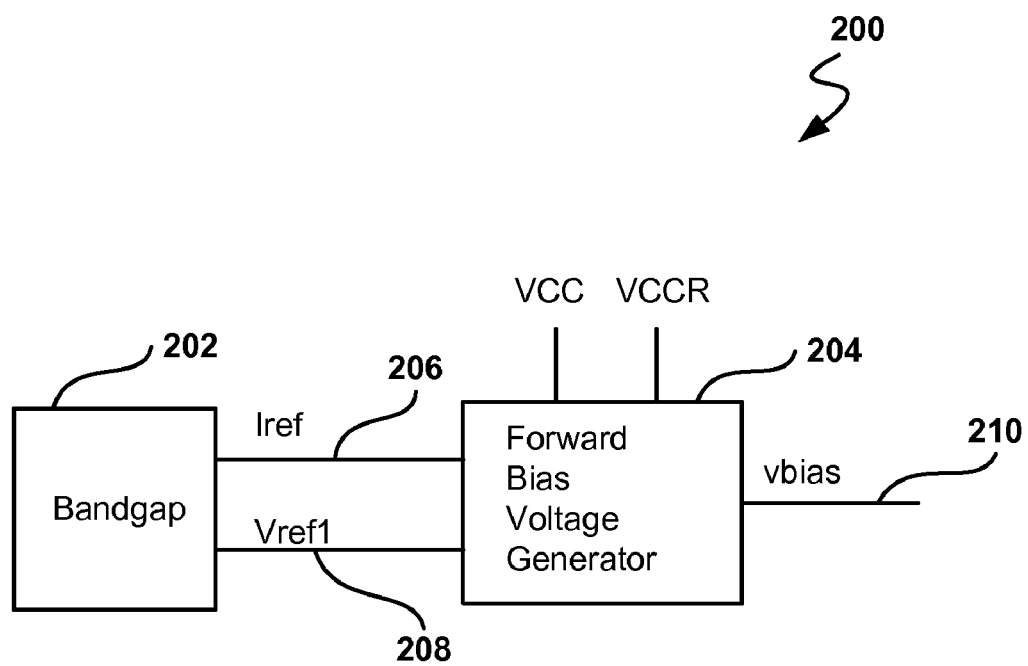
FIG. 2 describes a schematic for a voltage bias generating circuit according to one embodiment.

FIG. 2 describes a schematic for a voltage bias generating circuit 200 according to one embodiment. Bandgap circuit 202 is a voltage reference circuit that provides reference current 206 and voltage reference 208. Forward bias voltage generator 204 produces a voltage bias 210 that varies according to the configuration of forward bias voltage generator 204.

Figure 3:
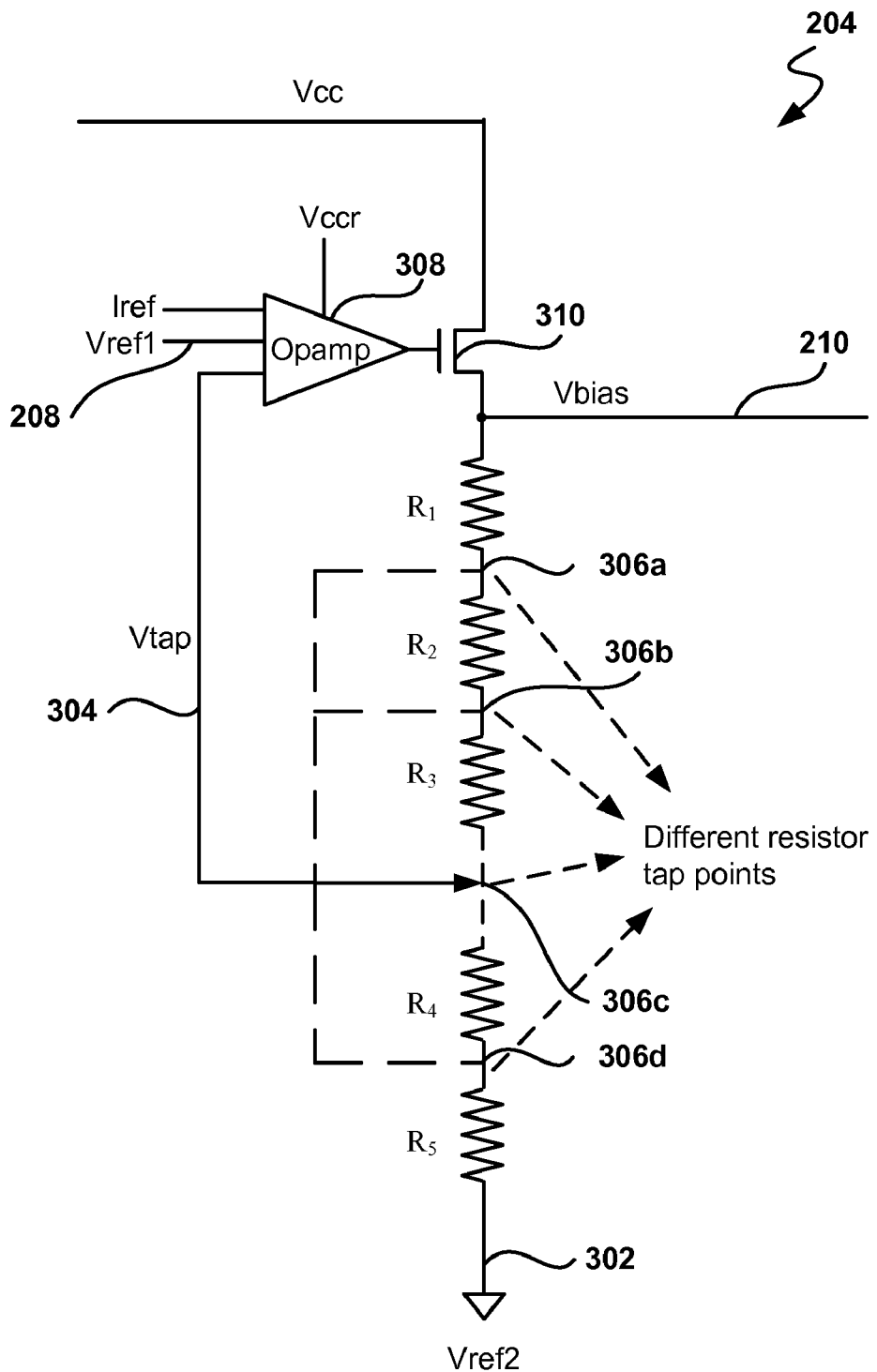
FIG. 3 shows a forward bias voltage generator for one embodiment of the invention.

FIG. 3 shows a forward bias voltage generator 204 for one embodiment of the invention. Amplifier 308 receives as inputs reference current Iref, voltage reference $V_{ref1}$ 208 and voltage tap $V_{tap}$ 304, and controls the gate of nMOS transistor 310. The drain of transistor 310 is connected to a second voltage reference $V_{ref2}$ 302 through a series of transistors $R_1$-$R_5$ in series. Multiple tapping points 306a-306d are available between the different resistors to achieve different $V_{bias}$ 210 values. In the stable condition, the $V_{bias}$ obtained will depend on the tapping point.

For example, to generate a $V_{bias}$ of 0.1V where $V_{ref1}$ is 0.5V, $V_{ref2}$ is 1V, and the current through the resistors is set at 1 mA, the resistance between tapping point 306c, $R_4$ and $R_5$ in this example, will have to be equal to (1V–0.5V)/1 mA, or 0.5KΩ. The resistance between $V_{bias}$ 210 and tapping point 306c, $R_1$ plus $R_2$ plus $R_3$, will be equal to (0.5V–0.1V)/1 ma, or 0.4KΩ.

The person skilled in the art will easily appreciate that other voltage bias generators are possible as long as they conform to the general principles of the invention presented here. A similar circuit for generating a forward bias using a PMOS transistor is also possible by using the same principles as described supra, and adapting the circuit characteristics to use the PMOS transistor.

Figure 4:
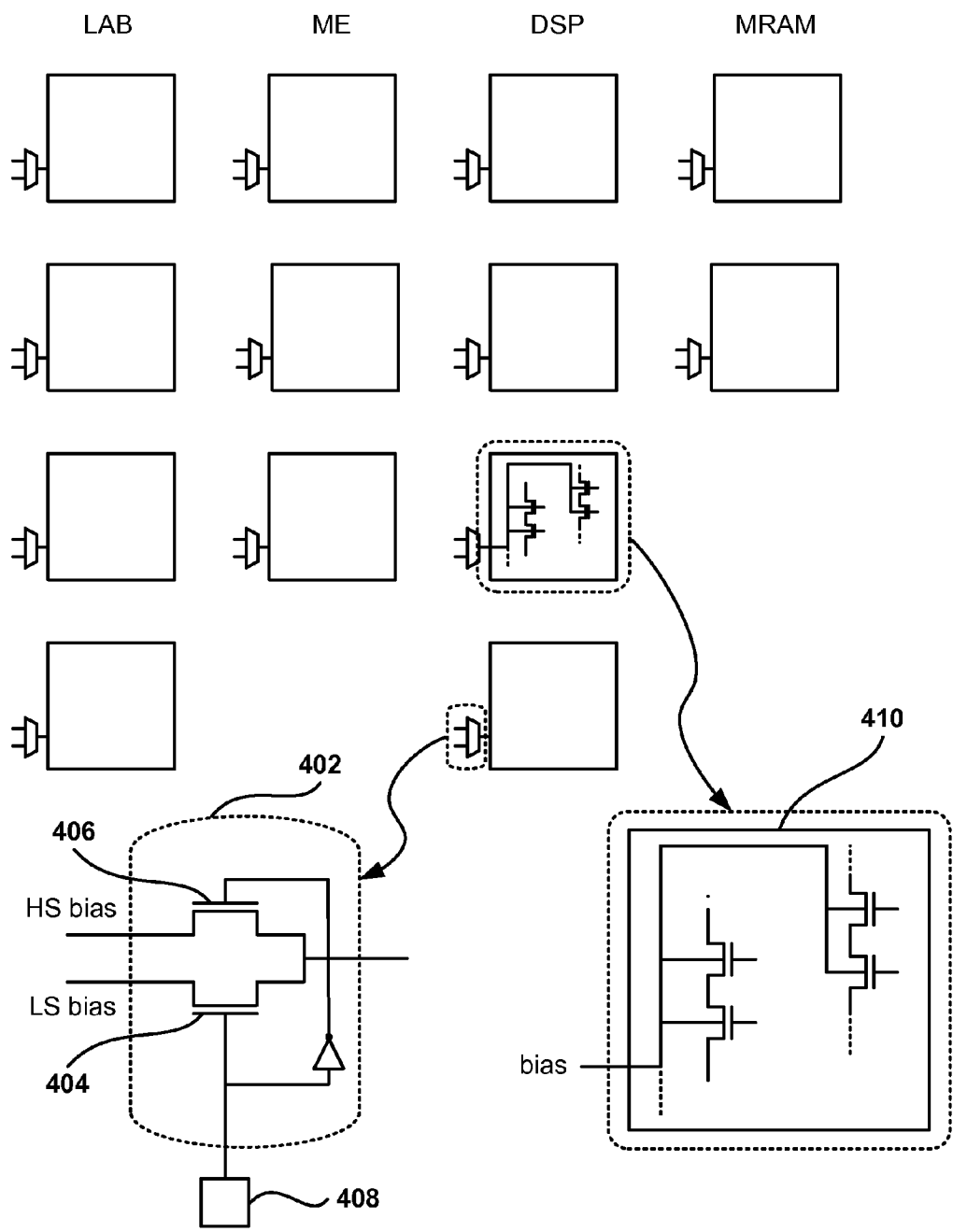
FIG. 4 depicts some of the components of an FPGA and the use of multiplexers to select the forward bias voltage in one embodiment.

FIG. 4 depicts some of the components of an FPGA and the use of multiplexers to select the forward bias voltage in one embodiment. Some of the different blocks or components of the PLD include Logic Array Blocks (LAB), Memory Elements (ME), Digital Signal Processors (DSP), Multibank Random Access Memory (MRAM), etc. Multiplexers are connected to each block, such as multiplexer 402, to control the forward voltage bias supplied to the block. In one embodiment of the invention, multiplexer 402 includes transistors 404 and 406 that are connected to a low speed (LS) voltage bias or high speed (HS) voltage bias respectively. The selection of HS bias or LS bias in the multiplexer is controlled by configuration random-access memory (CRAM) bit 408. Because each block is controlled by a different multiplexer with a different CRAM bit, it is possible to selectively apply different voltage bias to the different blocks of the PLD.

The body of transistors in block 410 would get the bias, HS or LS, selected by the corresponding multiplexer associated with block 410. Blocks using a low speed bias will use less power, thus enabling overall power savings. Blocks using a high speed bias will run faster while using more power. In a typical circuit, less than 20% of the design is speed critical. By applying the high speed bias to only 20% of the design, a tremendous amount of power can be saved. A circuit design tool can detect which parts of the design are speed critical and change the CRAM configuration to give the blocks in the critical path a high speed forward voltage bias.

In another embodiment, three or more voltage bias are available for the different modules. For example a 3:1 multiplexer can be used to select one of three different speed bias: low speed bias, standard speed bias and high speed bias. The low speed forward bias can be applied to modules that have enough delay slack so they can run at a lower speed while still meeting timing constrains.

In yet another embodiment, the high and low speed voltage bias are not the same for all the blocks, allowing for more flexibility in the power management of the different blocks.

Figure 5:
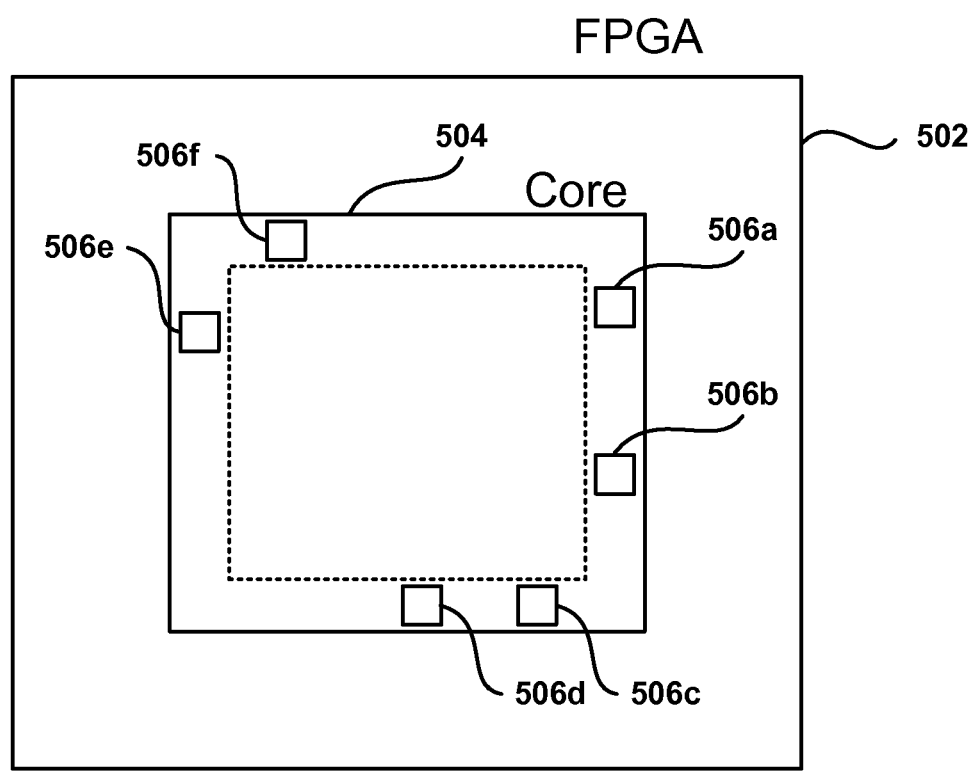
FIG. 5 describes the location of voltage regulators in an FPGA.

FIG. 5 describes the location of voltage regulators in an FPGA 502. Typically, voltage regulators 506a-506f are located in the periphery of core 504, but other locations are also possible. When using a $V_{cc}$ of 1V, a typical voltage range for high speed forward bias in NMOS transistors is from 0.4V to −0.5V, and for low speed voltage bias is 0V to −0.5V. The reason of the negative voltage is that when going to a FF corner, the TT speed is being achieved. In order to save power, the transistor is sent to use a negative value because there is no need for the extra speed and power is therefore saved. When using PMOS transistors, the typical range for high speed forward bias would be from 0.6V to 1V, thus moving the body voltage by up to 400 mV. While 400 mV is a typical value, other values are also possible.

In one embodiment, the circuit design tool decides the bias to be applied to the different voltage regulators 506a-506f. In another embodiment, a circuit designer selects the bias for the voltage regulators. In another embodiment, the PLD manufacturer sets permanently the values of the forward voltage bias. The units can then be sold according to their speed: high power, medium power, low power, etc.

Figure 6:
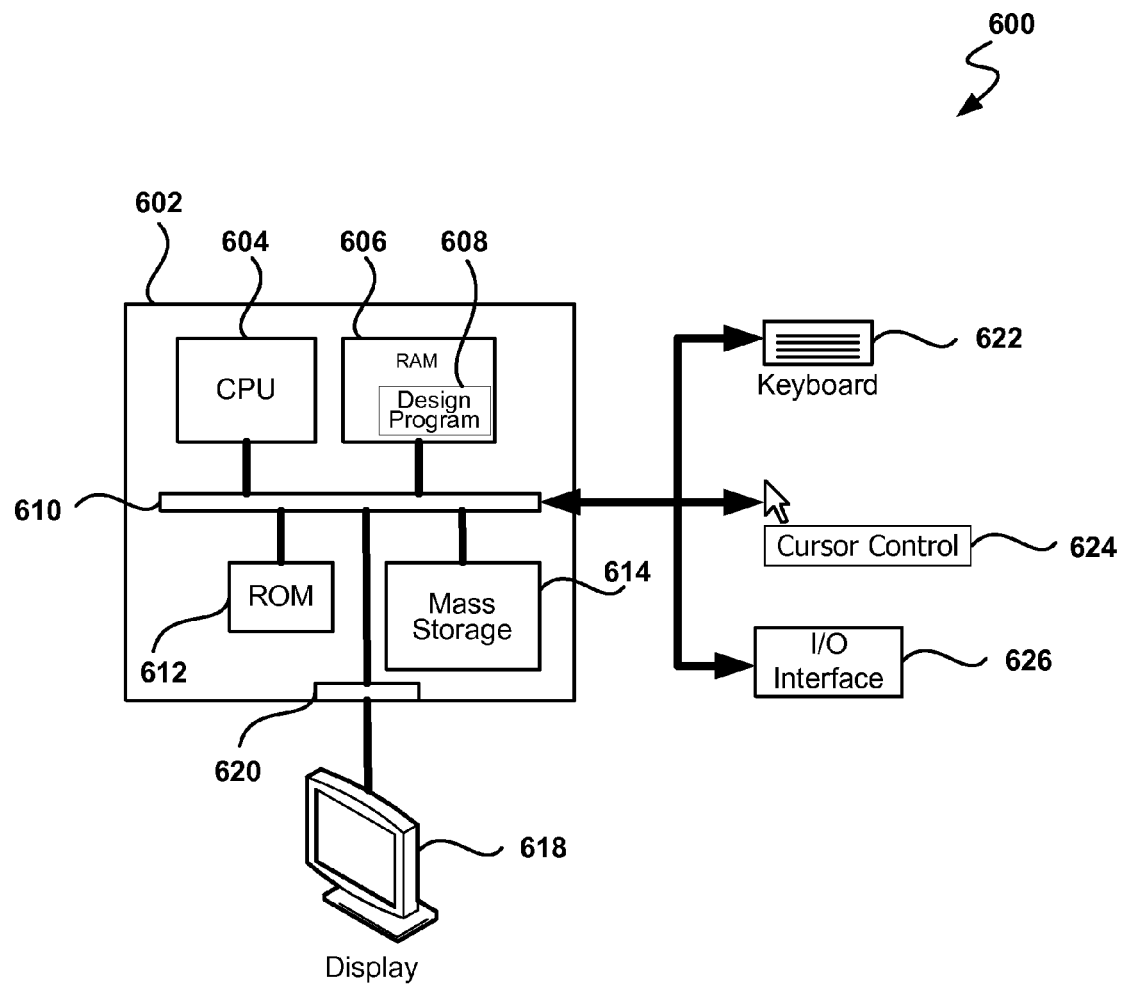
FIG. 6 is a simplified schematic diagram of a computer system for implementing embodiments of the present invention

FIG. 6 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 6 may be used to calculate timing information in PLD circuit designs, as well as critical paths for signal propagation in the PLD. The computer system includes a central processing unit (CPU) 604, which is coupled through bus 610 to random access memory (RAM) 606, read-only memory (ROM) 612, and mass storage device 614. The circuit design program 608 resides in random access memory (RAM) 606, but can also reside in mass storage device 614.

Mass storage device 614 represents a persistent data storage device such as a floppy disc drive or a fixed disc drive, which may be local or remote. It should be appreciated that CPU 604 may be embodied in a general-purpose processor, a special purpose processor, or a specially programmed logic device. Display 618 is in communication with CPU 604, RAM 606, ROM 612, and mass storage device 614, through bus 610 and display interface 620. Of course, display 618 is configured to display the user interfaces described herein. Keyboard 622, cursor control 624, and input/output interface 626 are coupled to bus 610 in order to communicate information in command selections to CPU 604. It should be appreciated that data to and from external devices may be communicated through input output interface 626.

Figure 7:
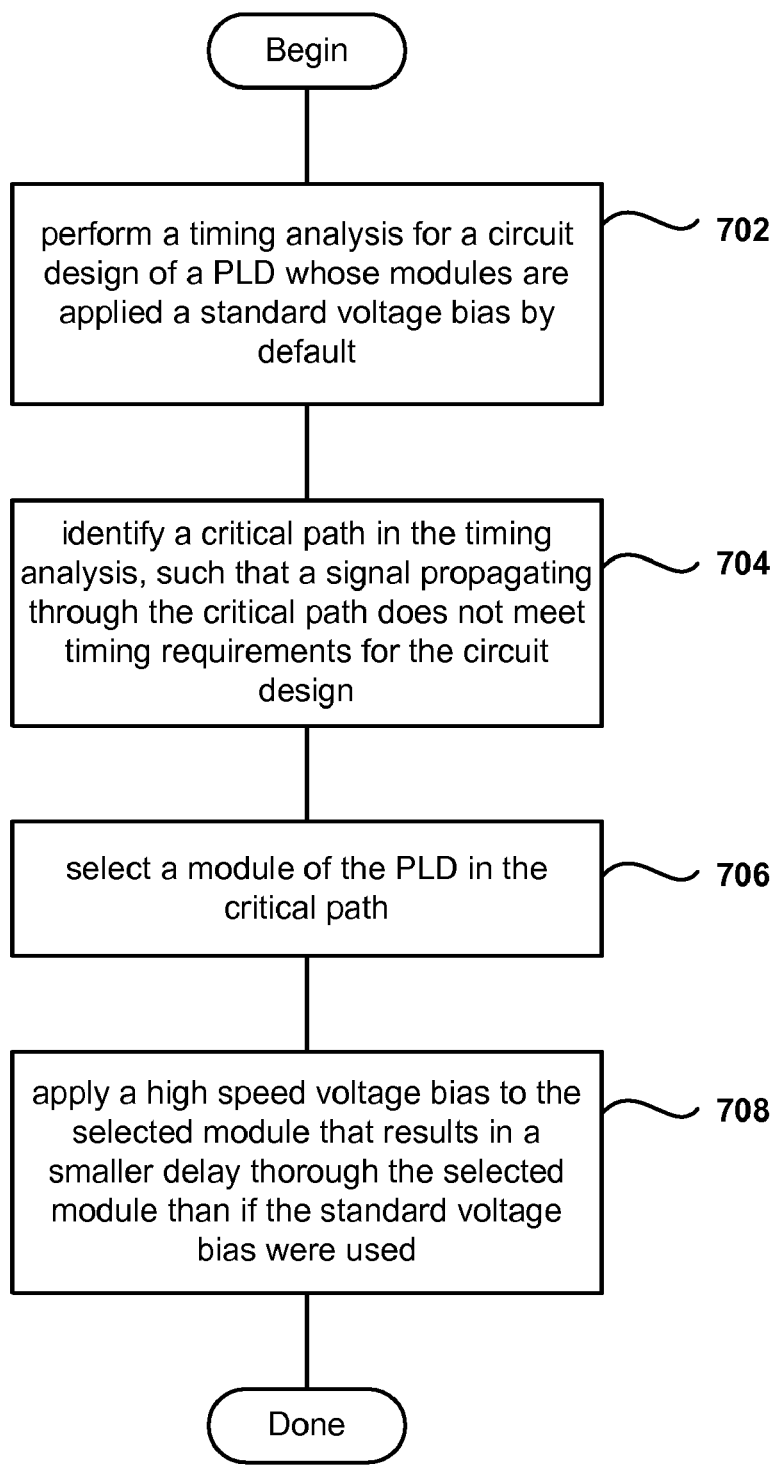
FIG. 7 shows the process flow for improving PLD performance in accordance with one embodiment of the invention.

FIG. 7 shows the process flow for improving PLD performance in accordance with one embodiment of the invention. In operation 702, the method performs a timing analysis for a circuit design of a PLD. The modules in the circuit design are applied a standard voltage bias by default, causing the corresponding transistors in the module to use the standard voltage bias. In one embodiment, a circuit design tool performs the timing analysis of the PLD. The timing analysis can include: signal propagation delay through gates and wires, critical paths where the signal will not reach its destination according to performance metrics required by the circuit, input/output (I/O) standards support, etc. In one embodiment, the circuit analysis is performed by design program 608, as seen in FIG. 6.

Referring back to FIG. 7, operation 704 identifies a critical path in the timing analysis, where the signal propagating through the critical path does not meet timing requirements for the circuit design. In operation 706, the method selects a module in the critical path to use a high speed voltage bias. In one embodiment, the module selected is the one that produces the highest delay from all the modules in the critical path. In another embodiment, a plurality of modules is selected in the critical path to be biased with the higher speed voltage bias. In another embodiment, an iterative process is used by adding high speed bias to modules one at a time, and then performing timing analysis until all timing requirements are met.

The high speed voltage bias is applied to the selected module in operation 708. The high speed voltage bias is greater than the standard voltage bias, thus enabling the transistors in the selected module to deliver more power and reduce the delay thorough the selected module, where the delay is smaller than if the standard voltage bias were applied to the selected module. In one embodiment, multiplexer 402 of FIG. 4 is used to apply the high speed or low speed forward voltage bias. In another embodiment, voltage regulator 204 from FIGS. 2 and 3 is used to generate the different voltage bias.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The methods and systems, for improving performance in a PLD, described herein may be incorporated into any suitable integrated circuit. For example, the methods and systems may be incorporated into other types of programmable logic devices such as programmable array logic (PAL), programmable logic array (PLA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to improve performance in an integrated circuit (IC), comprising:
   performing a timing analysis for a circuit design of the IC, wherein modules in the circuit design are applied a first voltage bias by default;
   identifying a critical path in the timing analysis, wherein a signal propagating through the critical path does not meet timing requirements for the circuit design;
   determining a module of the IC in the critical path;
   selecting a tapping point from a plurality of serially coupled resistors to determine a second voltage bias at an output, wherein the tapping point is coupled to a first voltage source, wherein the plurality of serially coupled resistors are coupled between the output and a second voltage source; and
   applying the second voltage bias to the selected module, the second voltage bias being greater than the first voltage bias, wherein a delay through the selected module when applying the second voltage bias is smaller than when the first voltage bias is applied to the selected module, wherein at least one method operation is executed through a processor.

2. The method as recited in claim 1, wherein applying the second voltage bias to the selected module further includes:
   applying the second voltage bias to a body of each transistor in the selected module.

3. The method as recited in claim 1, wherein the performing of the timing analysis is executed by a circuit design tool.

4. The method as recited in claim 1, wherein identifying the critical path further includes:
   examining timing delays resulting from the timing analysis.

5. The method as recited in claim 1, wherein determining the module further includes:
   examining timing delays of modules in the critical path.

6. The method as recited in claim 5, further including:
   choosing a module that produces a highest delay from all modules in the critical path.

7. The method as recited in claim 1 further including:
   repeating the performing and the determining to apply the second voltage bias until the timing requirements for the circuit design are met.

8. The method as recited in claim 1 further including:
   selecting a non-critical module in the circuit design with delay slack; and
   applying a third voltage bias to the non-critical module, wherein a delay through the non-critical module with the third voltage bias is greater than when the first voltage bias is applied to the non-critical module.

9. The method as recited in claim 1, wherein a multiplexer coupled to the selected module is used to select one of the first or the second voltage bias.

10. The method as recited in claim 1, wherein a transistor is coupled to a third voltage source, to the output, and to an amplifier coupled to the tapping point.

11. A system to improve performance in an integrated circuit (IC), comprising:
    a circuit design tool that creates programming information for the IC according to a circuit design, the circuit design tool operable to perform timing analysis of the circuit design to identify a critical module of the IC in a critical path for signal propagation, wherein the circuit design includes:
    a first voltage bias generating circuit operable to output a first voltage bias, the first voltage bias operable to be applied by default to modules in the IC, wherein the first voltage bias generating circuit includes:
    an amplifier operable to receive a reference current, a first voltage, and a coupling to a tapping point; and
    resistors in series that couple the first voltage bias to a second voltage source, wherein the tapping point is configured to be coupled to one of the resistors;

a second voltage bias generating circuit operable to output a second voltage bias, a value of the second voltage bias being greater than a value of the first voltage bias; and a multiplexer operable to receive first voltage bias inputs and second voltage bias inputs, the output of the multiplexer being coupled to the critical module;

wherein the programming information for the IC is operable to cause the multiplexer to select the second voltage bias, and wherein a delay in the signal propagation through the critical module having the second voltage bias is smaller relative to when the first voltage bias is applied to the critical module.

12. The system as recited in claim 11, wherein the second voltage bias is applied to a body of each transistor in the critical module.

13. The system as recited in claim 11, wherein the first voltage bias generating circuit further includes:

a transistor that couples a third voltage source to the first voltage bias, a gate of the transistor coupled to the first voltage bias.

14. The system as recited in claim 11, wherein the circuit design further includes:

a plurality of multiplexers, wherein each multiplexer is configurable to select one of the first voltage bias or the second voltage bias, wherein each multiplexer is coupled to a module in the IC, and wherein a plurality of modules in the critical path are operable to be programmed to be coupled to the second voltage bias.

15. The system as recited in claim 11, wherein the circuit design tool is operable to identify the critical module in the IC by selecting a module in the critical path with a highest delay from all modules in the critical path.

16. The system as recited in claim 11, wherein the IC comprises a programmable logic device.

17. A circuit for adjusting transistor voltage bias in an integrated circuit (IC), the circuit comprising:

a plurality of resistors coupled in series, wherein a first terminal from a first resistor from the plurality of resistors is coupled to a first voltage source;

an amplifier operable to have inputs that include a reference current, a second voltage source, and a coupling to a tapping point from a plurality of tapping points, wherein each tapping point from the plurality of tapping points is a terminal of a resistor from the plurality of resistors; and a transistor coupling a third voltage source to a second terminal from a second resistor from the plurality of resistors, a gate of the transistor coupled to an output of the amplifier, wherein programming information for the IC is operable to determine a selection of the tapping point from the plurality of tapping points to generate a transistor voltage bias output at the second terminal from a plurality of transistor voltage biases.

18. The circuit as recited in claim 17, further including:

a multiplexer coupled to the transistor voltage bias output and to a second transistor voltage bias source, an output of the multiplexer coupled to a body of a transistor.

19. The circuit as recited in claim 17, wherein bits stored in a memory program voltage biases for modules of the IC.

20. The circuit as recited in claim 17, wherein the transistor voltage bias output is applied to bodies of transistors in a first plurality of modules of the IC, and wherein a second transistor voltage bias different from the transistor voltage bias output is applied to a second plurality of modules of the IC.

* * * * *